United States Patent Office 3,707,510
Patented Dec. 26, 1972

3,707,510
CATALYST STRUCTURE FOR THE DECOMPOSITION OF HYDRAZINE AND HYDRAZINE DERIVATIVES AND METHOD FOR ITS PREPARATION
Reinhard Sasse, Neuenstadt, Germany, assignor to Messerschmitt-Bolkow-Blohm Gesellschaft mit beschrankter Haftung, Munich, Germany
No Drawing. Filed Mar. 25, 1970, Ser. No. 22,709
Claims priority, application Germany, Mar. 29, 1969,
P 19 16 247.1
Int. Cl. B01j 11/06
U.S. Cl. 252—462
7 Claims

ABSTRACT OF THE DISCLOSURE

A catalyst structure suitable for catalyzing the decomposition of hydrazine and hydrazine derivatives comprises a customary catalyst body which is imparted with an activating coating for increasing and inducing the catalyst activity. The activating coating comprises oxides of copper and cobalt and at least one of the oxides of thorium, cerium, or cerium-rare earth metals. The catalyst body proper may be made from cobalt-aluminum or nickel-aluminum alloy from which the aluminum has been dissolved by alkaline dissolution. Chromium-nickel steel may also be used as the catalyst body.

The invention also discloses a method of preparing the novel catalyst structure in which the catalyst body proper is wetted with an aqueous solution of the respective metal nitrates, whereupon the thus moist catalyst body is heated to at least 200° C. to decompose the nitrates into the corresponding oxides.

FIELD OF THE INVENTION

The invention relates to catalysts suitable for the decomposition of hydrazine and hydrazine derivatives and to a method for preparing such catalysts.

BACKGROUND INFORMATION AND PRIOR ART

The decomposition of hydrazine and hydrazine derivatives is customarily catalyzed by suitable catalysts. A number of different catalysts have been proposed for this purpose. According to one prior art proposal a suitable catalyst is obtained from cobalt-aluminum or nickel-aluminum alloys from which the aluminum is dissolved in alkaline manner. In this manner, a catalyst body of large active surface is obtained which is capable of actively inducing or catalyzing the decomposition of the monergolic hydrazine or hydrazine derivatives. These known catalysts, however, have the disadvantage that they require a long start-up time in cold condition. In other words, the catalytic activity of the catalysts sets in after a prolonged period of time only and complete hydrazine decomposition is thus unduly delayed. The full catalytic activity of these known catalysts is thus exerted after considerable delay only, which, of course, is of great disadvantage from a practical point of view.

It has been attempted to overcome this drawback by catalyzing the decomposition of hydrazine with noble metal catalysts. Noble metals, however, are exceedingly expensive so that the manufacture of catalysts from noble metals for the indicated purpose is extremely costly. In addition, noble metals are rather scarce and they are not generally available on the market, particularly if large quantities are required.

SUMMARY OF THE INVENTION

It is a primary object of the present invention to provide a catalyst structure suitable for the decomposition of hydrazine and hydrazine derivatives which overcomes the drawbacks of the prior art catalysts and which is capable of catalyzing the decomposition of hydrazine and its derivatives in a superior manner.

It is also an object of the present invention to provide a catalyst structure which is relatively inexpensive and which exerts its full catalytic activity without any delay.

Another object of the invention is to provide a novel catalyst structure for the indicated purpose which permits the use of prior art catalysts but which are activated so as to eliminate the protracted start-up time previously referred to.

It is also an object of the invention to provide a simple method for preparing the new catalyst structure.

Generally, it is an object of the invention to improve on the art of catalysts for the catalytic decomposition of hydrazine and its derivatives, as presently practiced.

Briefly and in accordance with the invention a hydrazine catalyst is activated by an oxidic surface coating of the oxides of copper and cobalt and at least one additional oxide being the oxide of thorium or rare earth metals. The term "rare earth metals" for the purposes of this application refers to the rare earth as they are found, for example, in bastnasite and monazite. These rare earths are primarily cerium, lanthanum, neodymium, praseodymium and samarium.

The catalyst body proper on which the inventive coating is applied may be a customary catalyst of the kind referred to. From a practical point of view and in order to obtain a large active surface it is recommended to use catalyst bodies of fibrous metal, for example, made from chromium-nickel steel. It is also advantageous to use a catalyst body which is in the form of non-rusting metal strips or plates of any desired shape which have a plurality of slits or apertures. These slits or apertures may be formed by stretching or drawing the metal plates or strips beyond their resistance value to elongation, whereby the slits or apertures are formed in the manner of an apertured partition. The basic catalyst body may also be in the form of a customary skeleton or lattice catalyst as obtained by alkaline dissolution of aluminum from cobalt-aluminum or nickel-aluminum alloys to form Raney cobalt or Raney nickel.

The novel catalyst structure may be produced by applying an aqueous solution of the respective metal nitrates to the catalyst body, whereupon the catalyst body with the solution applied thereto is heated to at least about 200° C. The nitrates are then decomposed into the corresponding oxides. In order to apply the solution to the catalyst body, the latter may simply be dipped or immersed in the aqueous solution, the heating being performed after the moist body has been removed from the bath. In order to obtain an oxide coating of desirable thickness, the dipping of the body into the solution may be repeated one or several times, the heating preferably being effected after each dipping procedure. Of course, the solution may be applied in different ways, e.g. by spraying. When the moist body is heated to at least 200° C. the nitrates, of course, decompose to form the corresponding oxides. While it has been stated that the moist catalyst body should be heated to at least 200° C., which is the temperature which normally will be necessary to cause the decomposition of the nitrates into the oxides, it will be appreciated that higher temperatures can be employed. Generally, the maximum temperature to which the body should be heated would be the respective annealing temperature which is about 600° C.

Due to the heat treatment of the catalyst body with the nitrate solution thereon, spinels are formed on the surface of the catalyst body. These metal oxide formations, which are in a nature of a coating or layer, significantly activate the catalyst body proper so that during operation, spontaneous decomposition of the hydrazine or the hydrazine derivative takes place.

It has also been ascertained that the metal oxide coating on the catalyst body exhibits excellent adhesion characteristics on the surface of the catalyst body. The catalyst structures of the invention have thus a long life and the coatings do not peel off. Further, the inventive catalyst structure has superior temperature stability. By dipping the catalyst body proper repeatedly in the aqueous solution, coatings are obtained which result in a catalyst structure of increased and prolonged reactivity. The life of the catalyst structure is also increased if the dipping of the bodies is repeated several times.

The invention will now be described by several examples, it being understood however, that these examples are given by way of illustration and not by way of limitation, and that many changes may be effected without affecting in any way the scope and spirit of the invention as recited in the appended claims.

Example 1

This test was carried out with an aqueous solution having the following composition:

about 40% parts by weight of copper nitrate
about 40% parts by weight of cobalt nitrate, and
about 20% parts by weight of cerium nitrate.

A catalyst body made from fibrous chromium-nickel steel was dipped into the aqueous solution and the moist body thus obtained was heated to about 400° C. A catalyst structure was thus obtained which was capable to induce spontaneous decomposition of hydrazine.

Example 2

This test was carried out in an aqueous solution having the following composition:

about 27% parts by weight of copper nitrate
about 63% parts by weight of cobalt nitrate, and
about 10% parts by weight of thorium nitrate.

A conventional hydrazine catalyst obtained by dissolving aluminum from a nickel-aluminum alloy was dipped into the solution and the moist body thus obtained was then heated to 550° C. The dipping and the subsequent heating were repeated four times.

A superior catalyst structure capable of inducing spontaneous decomposition of hydrazine was obtained.

Example 3

This experiment was carried out with an aqueous solution having the following composition:

about 27% parts by weight of copper nitrate
about 63% parts by weight of cobalt nitrate, and
about 10% parts by weight of rare earth metal nitrate.

The rare earths had the following composition:

about 45 to 50% parts by weight of cerium
about 20 to 25% parts by weight of lanthanum
about 15 to 20% parts by weight of neodymium
about 5% parts by weight of praseodymium, and
about 5% parts by weight of samarium.

A catalyst body obtained by alkaline dissolution of cobalt-aluminum alloy and having a plurality of apertures and slits was dipped into the solution and thereupon heated to about 500° C. The dipping was repeated three times, followed each time by heating to the indicated temperature.

The catalytic structure thus obtained was capable of catalyzing spontaneous decomposition of hydrazine.

It will be appreciated from the above, that the novel catalyst structure causes spontaneous decomposition of hydrazine and its derivatives, which in the prior art could only be obtained by the use of extremely expensive noble metal catalysts. By contrast, the inventive catalyst structure is inexpensive and is produced in a simple manner.

The inventive catalyst structure is capable of catalyzing the decomposition of not only hydrazine and its derivatives but also of other monergolic systems, as, for example, hydrazine-water and hydrazine-methanol mixtures as they are used, for example, in gas generators.

What is claimed is:

1. A catalyst structure suitable for catalyzing the decomposition of hydrazine and hydrazine derivatives comprising in combination:
    (a) a catalyst body of metal selected from the group consisting of Raney nickel, Raney cobalt and chromium-nickel steel and capable of catalyzing the decomposition of hydrazine and hydrazine derivatives and
    (b) an activating coating on said catalyst body of a thickness sufficient to speed up the catalytic activity of said catalyst body, said activating coating comprising oxides of copper and cobalt and at least one of the oxides of thorium, cerium, lanthanum, neodymium, praseodymium or samarium.

2. A catalyst structure as claimed in claim 1, wherein said activating coating has an oxide composition which is obtained by heating to at least 200° C. a mixture of
    about 40% parts by weight of copper nitrate
    about 40% parts by weight of cobalt nitrate, and
    about 20% parts by weight of cerium nitrate
on said catalyst body.

3. A catalyst structure as claimed in claim 1, wherein said activating coating has an oxide composition which is obtained by heating to at least 200° C. a mixture of:
    about 27% parts by weight of copper nitrate
    about 63% parts by weight of cobalt nitrate, and
    about 10% parts by weight of thorium nitrate
on said catalyst body.

4. A catalyst structure as claimed in claim 1, wherein said activating coating has an oxide composition which is obtained by heating to at least 200° C. a mixture of:
    about 27% parts by weight of copper nitrate
    about 63% parts by weight of cobalt nitrate, and
    about 10% parts by weight of rare earth metal nitrate on said catalyst body said rare earth metal nitrate consisting essentially of:
    about 45–50% by weight of cerium,
    about 20–25% by weight of lanthanum,
    about 15–20% by weight of neodymium,
    about 5% by weight of praseodymium, and
    about 5% by weight of samarium.

5. A catalyst structure as claimed in claim 1, wherein the metal of said catalyst body is fibrous.

6. A catalyst structure as claimed in claim 1, wherein the metal of said catalyst body is a non-rusting metal plate or strip containing a plurality of slits or apertures.

7. A catalyst structure as claimed in claim 6, wherein said metal plate or strip has been stretched beyond its resistance value to elongation to form said slits or apertures.

References Cited

UNITED STATES PATENTS

| | | | |
|---|---|---|---|
| 3,208,131 | 9/1965 | Ruff | 29—157 |
| 3,036,973 | 5/1962 | Hindley | 252—474 |
| 3,544,279 | 10/1967 | Winsel | 23—288 |
| 3,165,382 | 1/1965 | Forte | 23—212 |
| 3,560,407 | 2/1971 | McCormick | 252—462 X |

FOREIGN PATENTS

| | | | |
|---|---|---|---|
| 635,282 | 1/1962 | Canada | 23—212 |

DANIEL E. WYMAN, Primary Examiner

W. J. SHINE, Assistant Examiner

U.S. Cl. X.R.

252—477 Q; 23—190